United States Patent [19]

Avitan

[11] Patent Number: 5,039,924
[45] Date of Patent: Aug. 13, 1991

[54] TRACTION MOTOR OPTIMIZING SYSTEM FOR FORKLIFT VEHICLES

[75] Inventor: Isaac Avitan, Vestal, N.Y.

[73] Assignee: Raymond Corporation, Greene, N.Y.

[21] Appl. No.: 519,988

[22] Filed: May 7, 1990

[51] Int. Cl.[5] .............................................. H02P 7/06
[52] U.S. Cl. ..................................... 318/139; 318/493; 388/803
[58] Field of Search ............... 318/139, 255, 256, 257, 318/268, 493, 494; 388/800, 801, 802, 803, 809, 810

[56] References Cited

U.S. PATENT DOCUMENTS

| | | | |
|---|---|---|---|
| 4,099,111 | 7/1978 | Inaba et al. | 318/493 X |
| 4,196,377 | 4/1980 | Boxer | 318/269 |
| 4,422,022 | 12/1983 | Hill et al. | 318/376 |
| 4,475,070 | 10/1984 | Wilkerson | 318/493 X |
| 4,484,117 | 11/1984 | Bose | 318/493 X |
| 4,549,122 | 10/1985 | Berkopec et al. | 388/806 |
| 4,947,088 | 8/1990 | Kisakibaru et al. | 318/6 |

*Primary Examiner*—Bentsu Ro
*Attorney, Agent, or Firm*—Salzman & Levy

[57] ABSTRACT

A system for optimizing control of separately excited shunt-wound dc motors, where optimization is achieved through microprocessor-based independent PWM control of a chopper (armature) and an H-bridge (field). Connected to the armature is an armature voltage amplifier for varying the applied armature voltage. A field voltage amplifier is also provided for determining the direction of motor rotation and varying the voltage applied to the field winding. A first sensor is connected to the motor armature in order to determine the motor rotational speed. A second sensor is connected to the armature circuit in order to determine the armature current. A third sensor is connected to the field circuit in order to determine the field current. A decoupling controller uses the motor speed and armature current information, and adjusts the armature voltage and the field voltage. An optimal controller uses the motor speed, field current and armature current information, and adjusts the armature voltage and the field voltage.

9 Claims, 5 Drawing Sheets

| FIG. 3A | FIG. 3B |
|---|---|

TRACTION MOTOR OPTIMIZING SYSTEM FOR FORKLIFT VEHICLES

RELATED APPLICATION

The present application is related to U.S. patent application Ser. No. 07/519,987, filed concurrently herewith for "TRACTION MOTOR CONTROLLER FOR FORKLIFT VEHICLES".

BACKGROUND OF THE INVENTION

The present invention relates to dc motor optimizing systems and, more particularly, to optimizing systems for dc motors having separately excited armature and field windings.

Material handling trucks fall into one of several power plant categories. One such category is the electric vehicle, the energy source for which is a lead-acid battery that can weigh many thousands of pounds. Besides providing the energy source to the vehicle, in many instances the battery also provides vehicle counterbalance.

The ratio of the load weight to the gross unloaded vehicle weight of industrial lift trucks is extremely important. For example, if an unladen vehicle weighs 12,000 lbs, and the maximum load weight it can carry is 4,000 lbs, then the gross unladen/laden weight may vary from as little as 12,000 to as much as 16,000 lbs. This represents a change of 33% in motor torque requirements. Moreover, the vehicle must be able to maneuver on loading ramps, further increasing the motor torque requirements. For these and other reasons, it is desirable to have an optimizing system capable of extracting precise and efficient work from the vehicle.

The main motive element of this type of vehicle, referred to as the traction system, conventionally consists of a series-wound dc motor coupled to a gear reducer and drive wheel. Some electric vehicles utilize a single "steer-drive" traction system, while others employ a "dual-drive" (differential) traction system.

The rotational direction of the series-wound dc motor is controlled by the polarity orientation of the field winding with respect to the armature. Under conventional control, the field winding orientation is controlled through a pair of contactors, such that when power is applied across the field-armature combination, the motor is caused to rotate in the desired direction.

The series-wound dc motor, heretofore used extensively in industrial lift trucks, displays one very important characteristic: it has extremely high torque at zero speed. This is extremely important, because it provides the necessary starting torque.

Under conventional control, the field-armature combination is controlled as a single unit. Motor speed regulation is achieved through voltage switching typically utilizing such power semiconductor technologies as silicon-controlled-rectifiers (SCR). The voltage drop associated with the SCR as well its duty cycle limit impose a speed limit on the motor. To extract the maximum speed from the motor and reduce overall system power loss, a bypass contactor is utilized across the SCR, thereby placing the motor's field-armature combination in series with the battery.

Under such a control scheme, however, the series dc motor does have one major drawback: it may operate only along its characteristic commutation curve limit. This results in motor speed variations due to changing torque loading arising from variations in load capacities, travel path conditions and grade variations.

With the proper controls, the use of a shunt-wound dc motor under independent field and armature control can provide distinct advantages over conventional series-wound dc motors for lift truck applications. The control method of the present invention provides the shunt-wound dc motor with the ability to simulate a series-wound dc motor, hence developing the necessary starting torque.

The separately excited dc motor represents a highly coupled multi-input, multi-output, non-linear, dynamic system or plant. It is highly coupled in the sense that, when one of its inputs is changed, all of the outputs are affected. This is undesirable, since the purpose of control is to knowingly and intentionally affect the desired output(s) only, without altering other output states.

U.S. Pat. No. 4,079,301 issued to Johnson, III discloses a dc motor control circuit having separately excited armature and field windings. The control circuit is operable in both the constant torque and constant horsepower modes. The transfer characteristics of the circuit provide high gain at low frequencies and low gain at higher frequencies. The circuit can further reduce the gain at low frequencies when motor operation switches from the constant torque mode to the constant horsepower mode.

U.S. Pat. No. 3,694,715 issued to Van Der Linde et al discloses a contactless dc motor reversing circuit. The current from a variable frequency, pulsed dc source is applied to the series field by a pair of solid state switching devices for forward motor rotation. A second pair of solid state switching devices applies current for reverse motor rotation. Common to both switching devices is a third switching device which normally carries the induced armature current between pulses. It is deenergized during transfer of conduction between both pairs of switching devices, assuring that the blocking state of one pair occurs before the second pair is turned on.

U.S. Pat. No. 4,264,846 issued to Sauer et al discloses a speed control braking circuit for a dc motor. The field and armature currents are independent of each other to allow motor operation in the field weakening region. The armature current is set by a pulsing dc element. The field winding is contained in a series circuit with a switch which is connected in parallel with the dc element. Shunted across the field winding is a field current bypass diode.

It would be advantageous to provide a system that optimizes for motor losses.

It would also be advantageous to provide a motor optimizing system capable of producing variable torque while maintaining constant speed.

It would also be advantageous to provide a system in which the characteristics of a series-wound dc motor could be simulated using a shunt-wound dc motor.

It would further be advantageous to provide a system in which a traction motor's field and armature windings are separately excited and controlled.

It would still further be advantageous to provide a system in which the optimizing control is achieved using software.

SUMMARY OF THE INVENTION

Independent field and armature control enables control of a motor anywhere along, and below its characteristic commutation curve limit. While a bypass contactor may be employed across the armature voltage switching device to reduce power losses, independent field control extends controllability of the motor, thereby making the system less sensitive to variations in load capacities, travel path conditions and grade variations.

A shunt-wound dc motor is the main motive mechanism replacement for the traditional series-wound dc motor. The shunt-wound dc motor's field windings require far less current than its series-wound counterpart, thereby making it economically feasible to apply full variability (voltage switching) field control.

Field and armature voltage switching is achieved through the utilization of power transistors as opposed to the traditional SCR's. Although SCR's provide an inexpensive means of voltage switching, they are limited in switching speed and require additional circuitry due to their non-self-commutating characteristics.

In accordance with the present invention, there is provided a system for optimizing control of separately excited shunt-wound dc motors, where optimization is achieved through microprocessor-based independent pulse-width-modulation (PWM) control of a chopper (armature) and an H-bridge (field). Connected to the armature is an armature voltage amplifier for varying the applied armature voltage. A field voltage amplifier is also provided for varying the voltage applied to the field winding. A first sensor is connected to the motor armature in order to determine the motor rotational speed. A second sensor is connected to the armature circuit in order to determine the armature current. A third sensor is connected to the field circuit in order to determine the field current. An optimal controller uses the motor speed, field current and armature current information, and adjusts the armature voltage and the field voltage.

The use of such a system results in many benefits including, but not limited to, optimized efficiency.

BRIEF DESCRIPTION OF THE DRAWINGS

A complete understanding of the present invention may be obtained by reference to the accompanying drawings, when taken in conjunction with the detailed description thereof and in which.

DESCRIPTION OF THE PREFERRED EMBODIMENT

Before describing the preferred embodiment of the present invention, it is desirable to discuss briefly the speed-torque characteristics of a series-wound dc motor.

Figure 1:
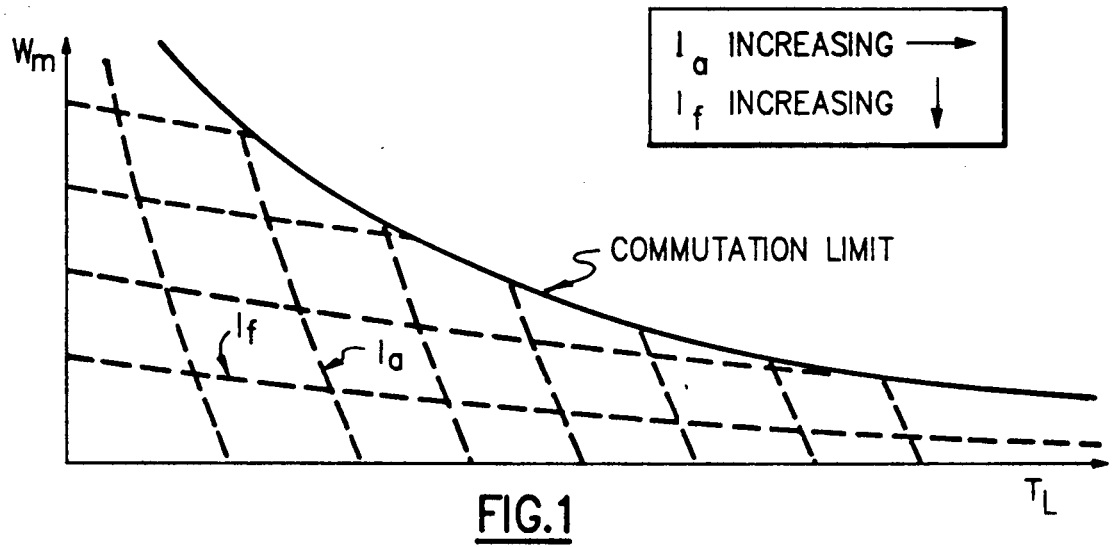
FIG. 1 is a graphical representation of a typical speed-torque relationship for series-wound dc motor.

Referring now to FIG. 1, there is shown a typical speed-torque graph for a series-wound dc motor showing the characteristic commutation limit, field current $I_f$ lines, and the armature current $I_a$ lines.

As discussed above, under conventional control a dc motor is restricted to operation along its characteristic commutation limit as represented by the motor rotational speed $W_m$ and motor shaft torque loading $\tau_L$. Hence, as can be seen from FIG. 1, a change in $\tau_L$ results in a change in $W_m$.

However, under independent and fully variable field and armature control, a change in $\tau_L$ may not necessarily result in a change in $W_m$. Rather, a control system in accordance with the present invention, and described in greater detail hereinbelow, can select a new motor operating point through $I_a$ and $I_f$ under the commutation limit resulting in an unchanged $W_m$ for the new torque loading value $\tau_L$.

Figure 2:
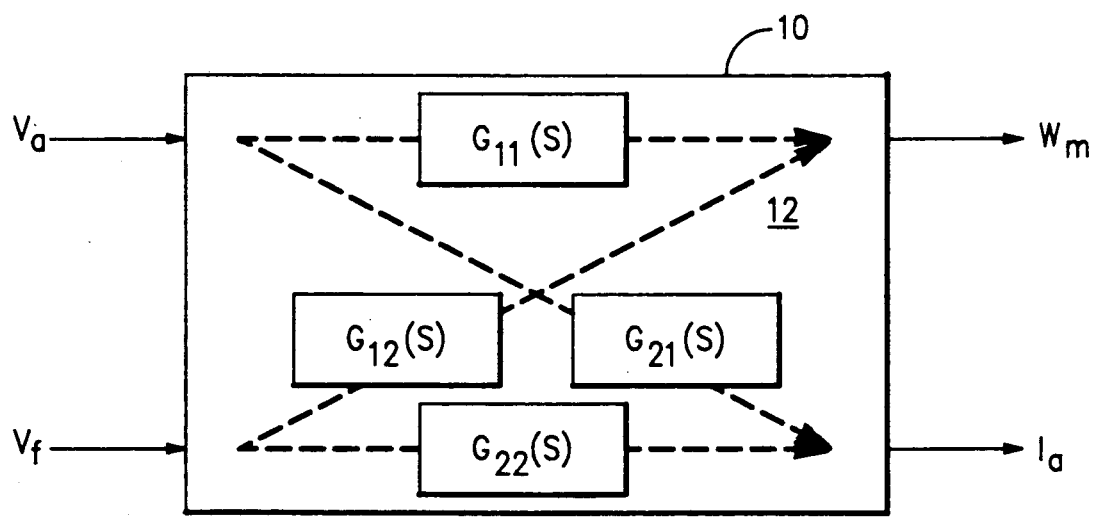
FIG. 2 is a block diagram of a multi-variable coupled system representation of a shunt-wound dc motor showing its particular internal channel transfer functions.

Referring now to FIG. 2, there is shown a block diagram of a multi-variable coupled system representation of a series- or shunt-wound dc motor.

An applied armature voltage $V_a$ and an applied field voltage $V_f$ are input to a motor 10. The physical transformations within the motor 10 may be suitably represented by cross channel transfer functions 12, to produce the motor rotational speed $W_m$ and armature current $I_a$ as outputs.

From an analysis of a series- or shunt-wound dc motor, it can be seen that the motor 10 consists of two first-order and two second-order dynamic systems. Such a motor system may be represented in the s-domain (Laplace transformation) by the transfer functions $G_{11}(s)$, $G_{12}(s)$, $G_{21}(s)$ and $G_{22}(s)$.

These transfer functions 12 are representative of the particular channels of the motor system defined as follows, $$G_{11}(s) = W_m(s)/V_a(s)$$

$$G_{12}(s) = W_m(s)/V_f(s)$$

$$G_{21}(s) = I_a(s)/V_a(s)$$

$$G_{22}(s) = I_a(s)/V_f(s)$$

where $G_{11}(s)$ and $G_{12}(s)$ are first-order systems, and $G_{21}(s)$ and $G_{22}(s)$ are second-order systems. Determination of these transfer functions 12 is analytical as well as experimental.

Figures 3, 3A:
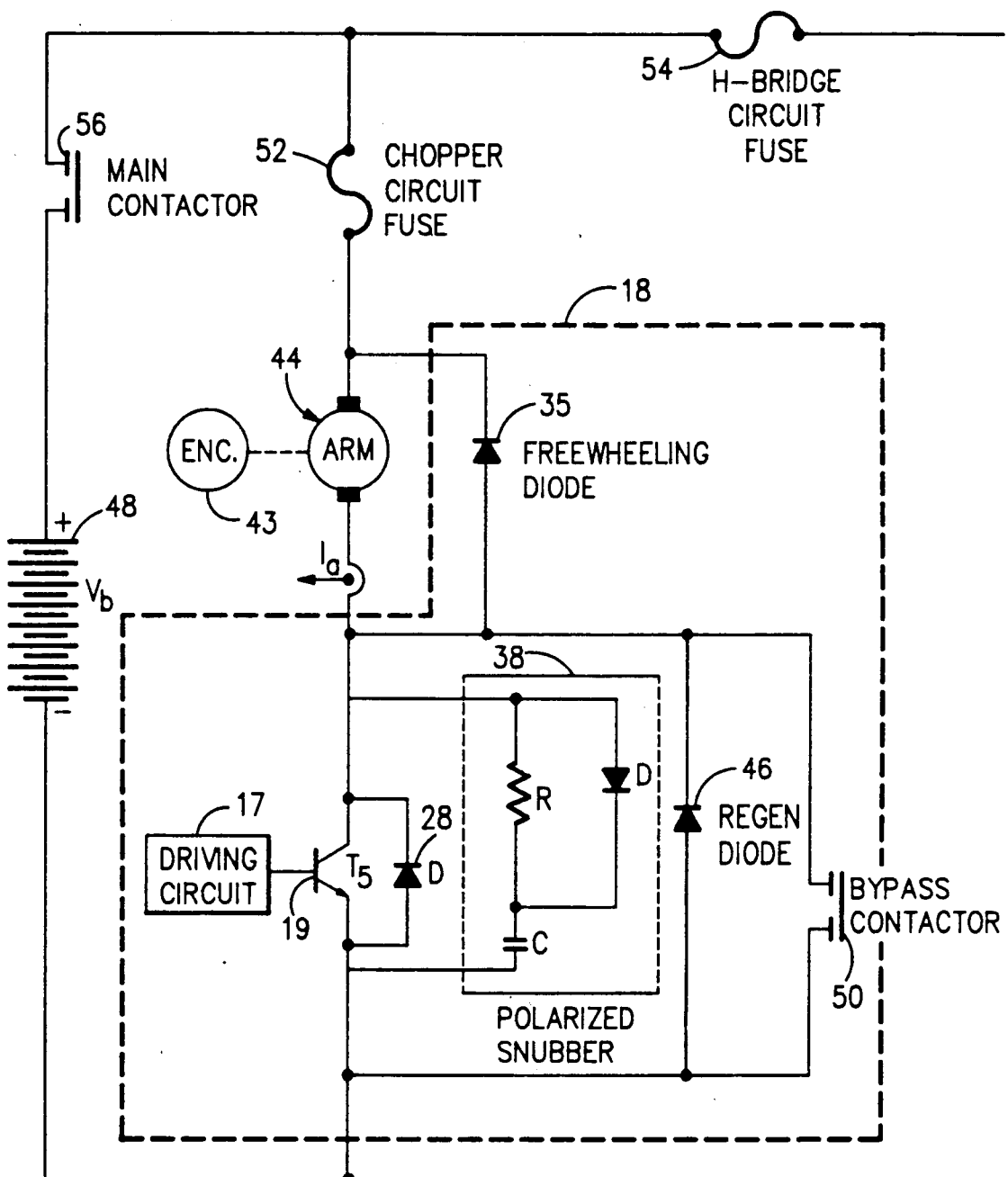
FIG. 3 is a schematic diagram of the preferred embodiment of a dc motor control circuit in accordance with the present invention.
Figure 3B:
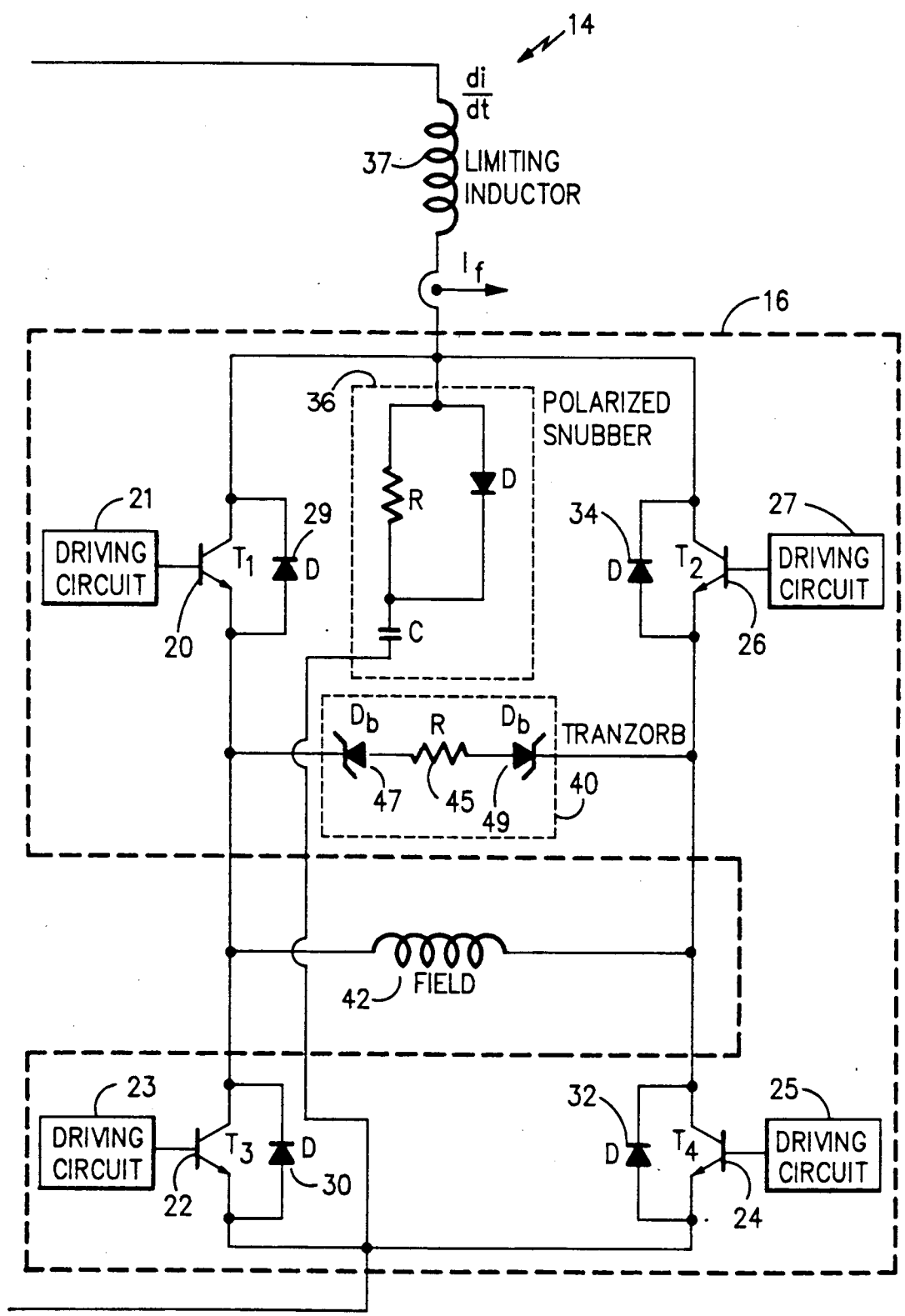

Referring now also to FIG. 3, there is shown a schematic diagram of a dc motor control circuit, shown generally as reference numeral 14, which provides independent control of a series- or shunt-wound dc motor by independently controlling its armature winding 44 and field winding 42. A load (not shown) is driven by the armature 44.

A suitable means for providing a feedback signal proportional to the motor rotational speed is indicated by encoder 43, which is connected to armature 44. It will, of course, be obvious to those skilled in the art that encoder 43 is merely exemplary and that other devices or methods can be employed to perform the same speed sensing function.

The primary components of motor control circuit 14 are a chopper circuit 18 which controls armature winding 44 and an H-Bridge circuit 16 which controls field winding 42. Two pairs of transistors 20, 24 and 26, 22 are connected to field winding 42, as shown.

Power is supplied to motor control circuit 14 by a dc battery 48. A main power contactor 56 is connected to battery 48 and chopper circuit 18 and H-Bridge circuit 16. Main contactor 56 enables system shut down should any system element fail.

A chopper circuit fuse 52 is connected between main contactor 56 and chopper circuit 18 to limit excessive current to chopper circuit 18. An H-Bridge circuit fuse 54 is connected between main contactor 56 and H-Bridge circuit 16 to limit excessive current to H-Bridge circuit 16.

Power regulation through armature winding 44 and field winding 42 is achieved through transistors 19 (in chopper circuit 18) and transistors 20, 22, 24 and 26 (in H-Bridge circuit 16). Control of transistors 19, 20, 22, 24 and 26 is achieved through driving circuits 17, 21, 23, 25 and 27, respectively. Motor rotation direction is dictated by the field winding 42 orientation with respect to the armature winding 44. Field winding 42 orientation is controlled by transistor pairs 22, 26 and 20, 24.

The ON-OFF ratio of transistors 19, 20, 22, 24 and 26 results in an average applied terminal voltage to armature winding 44 and field winding 42, respectively. As such, totally independent and fully variable control of armature winding 44 and field winding 42 is achieved.

Polarized snubber circuits 36 and 38 are provided in H-Bridge circuit 16 and chopper circuit 18 respectively to:

a) absorb switching power losses of transistors 19 (in chopper circuit 18), and transistors 20, 22, 24, 26 (in H-Bridge circuit 16);

b) prevent secondary breakdown due to localized heating effects during turn-on and turn-off of transistors; and c) prevent spurious turn-on of transistors due to dV/dt.

Free wheeling diodes 28, 29, 30, 32 and 34 provide a path for current upon turn-off of transistors 19, 20, 22, 24 and 26, respectively. Another free wheeling diode 35 is provided across armature 44, also to provide a current path when chopper circuit transistor 19 is turned off.

A dI/dt limiting inductor 37 is provided between H-Bridge circuit fuse 54 and H-Bridge circuit 16 to restrict the rate of rise of current through the H-Bridge circuit 16. This dI/dt limiting inductor 37 protects the H-Bridge circuit transistors 20, 22, 24 and 26 from armature voltage spikes. A pair of back to back breakdown diodes 47, 49 and a resistor 45 form a tranzorb 40 across field winding 42 to limit the field voltage.

A regeneration diode 46 connected across transistor 19 provides recirculation of load current back to battery 48 during part of the motor deceleration cycle.

A bypass contactor 50 connected across transistor 19 eliminates the power loss in transistor 19 during sustained high speed travel.

Figure 4:
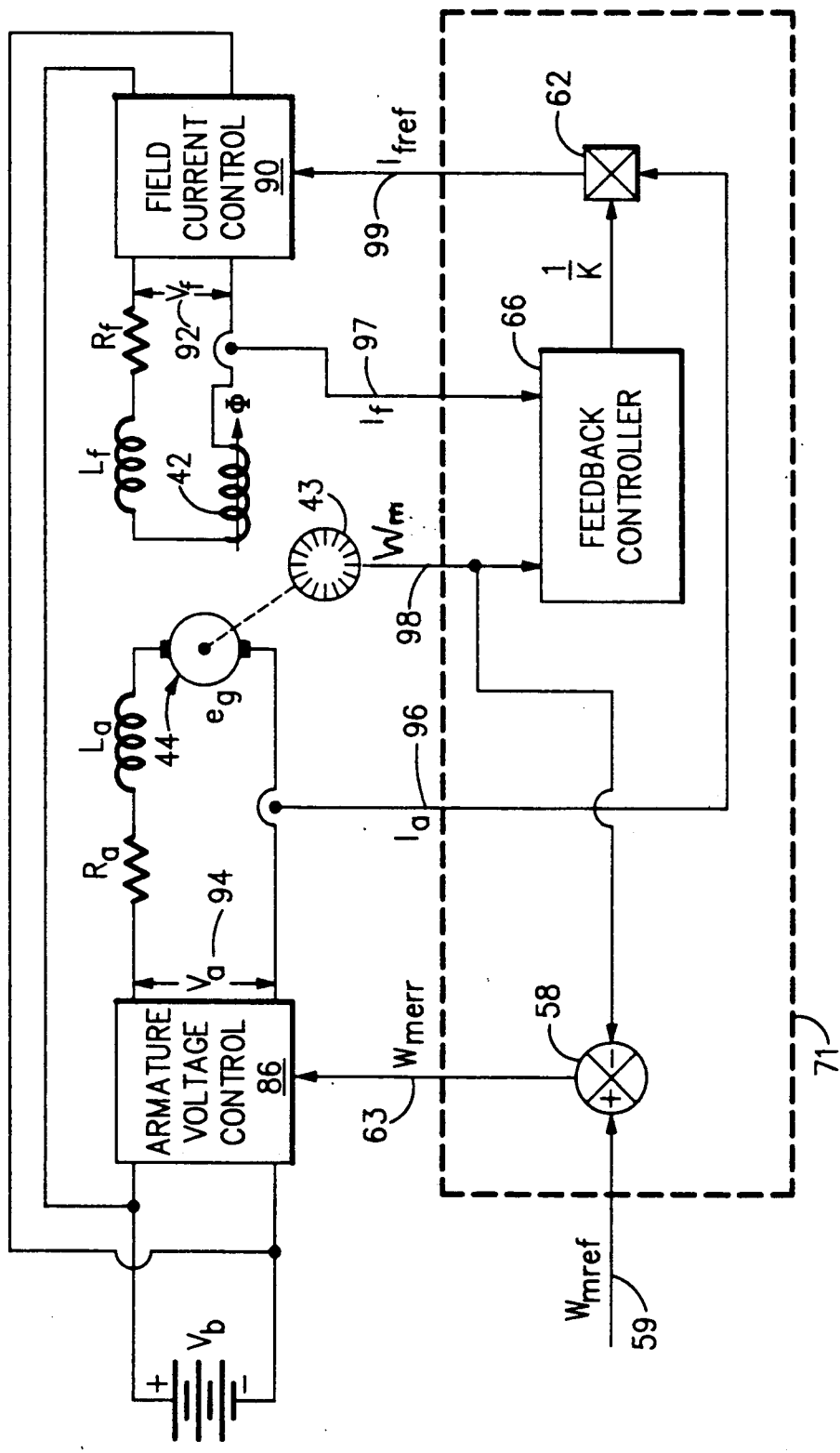
FIG. 4 is a block diagram of the optimal control system.

Referring now also to FIG. 4, there is shown a schematic block diagram of an optimal control circuit of a separately excited dc motor.

A programmable, microprocessor-based optimal control is shown generally at reference numeral 71.

A motor rotational speed reference signal $W_{mref}$ representing the desired value of motor speed, enters a summer 58 via line 59. Also applied to summer 58 is a signal $W_m$ representative of the actual motor rotational speed, which signal is generated by an encoder 43. Summer 58 produces an error motor rotational speed $W_{merr}$ signal representing the difference between actual and desired motor rotational speeds, $W_{merr}=W_{mref}-W_m$, which enters an armature voltage control amplifier 86 via line 63.

Armature voltage control amplifier 86 adjusts armature voltage $V_a$ 94, which causes the speed of motor 44 to vary. Encoder 43 is connected to motor 44 to sense rotational speed thereof and to generate a continuous signal representative of such new motor rotational speed $W_m$. This signal $W_m$ is fed back into summer 58.

The motor rotational speed signal $W_m$ is simultaneously fed via line 98 into a feedback controller 66 such as a Model No. 68HC11 microprocessor manufactured by the Motorola Corp.

Also simultaneously fed into feedback controller 66 via line 97 is field current signal $I_f$. Motor rotational speed $W_m$ and field current $I_f$ are both motor outputs.

Exiting feedback controller 71 is a Laplace transform variable 1/k of a unit step function, where k is the optimal ratio constant, representing optimal armature current to field current ratio. This optimal ratio constant may be computed or obtained from a suitable look-up table in feedback controller 66. The Laplace transform 1/k enters a multiplier 62, to which is applied another operand over line 96, representing armature current $I_a$. A field reference current $I_{fref}$ is produced by multiplier 62, mathematically represented as $I_{fref}=I_a/k$.

Signal $I_{fref}$ is applied to a field current control amplifier 90 via line 99. Field current control amplifier 90 amplifies the field voltage $V_f$, which varies field current $I_f$. Field current $I_f$ is then re-applied to feedback controller 66 to obtain a new value of optimal ratio constant k.

As a new value of motor rotational speed $W_m$ is produced and applied to summer 58, the cycle is repeated, thus providing optimal control over both the field and the armature and hence motor 44.

Figure 5:
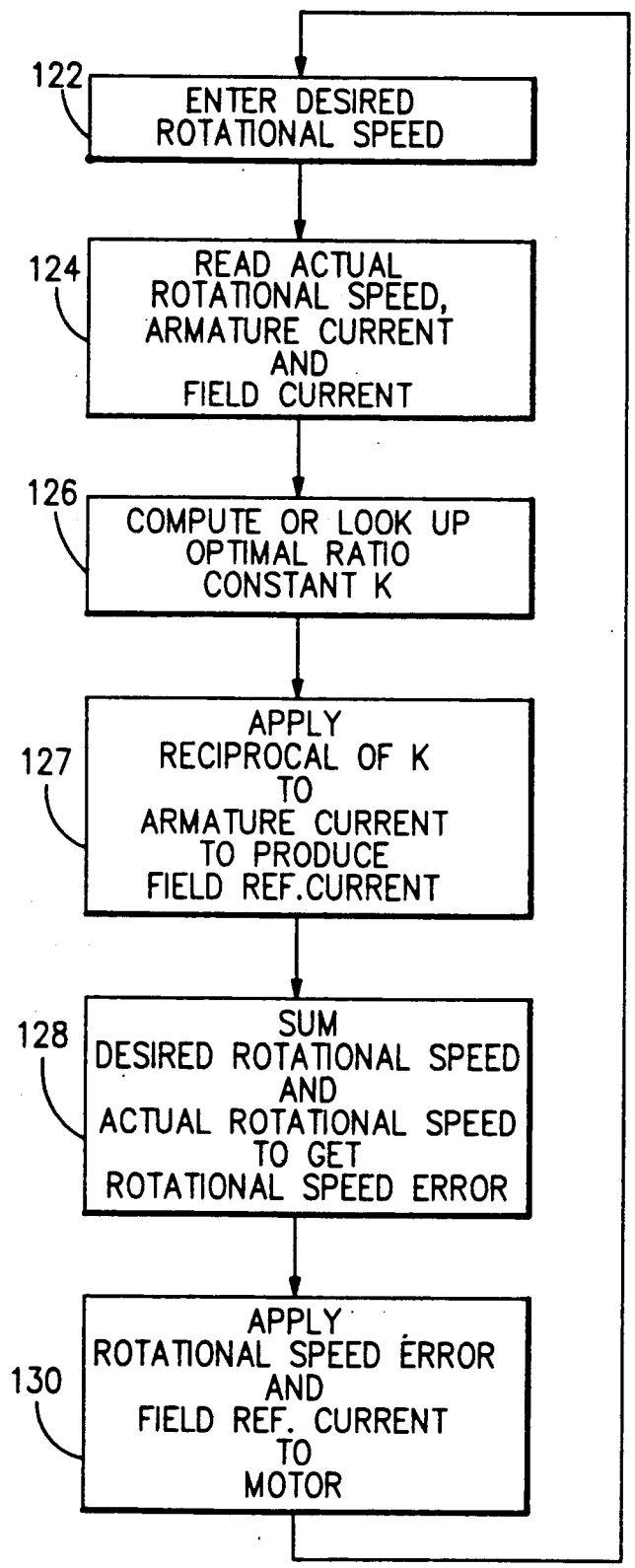
FIG. 5 is a flow chart of optimization control operation.

Referring now also to FIG. 5, there is shown flow chart of the optimization control circuit shown in FIG. 4.

The desired motor rotational speed $W_{mref}$ is entered into summer 58 of optimal control 71, step 122.

The actual motor rotational speed $W_m$, armature current $I_a$ and field current $I_f$ are read, step 124.

The optimal ratio constant k is computed or obtained by look-up table, step 126, and the reciprocal thereof then applied to armature current $I_a$, step 127, to result in field reference current.

$$I_{fref}=I_a/k.$$

Motor rotational speed error $W_{merr}$ is then computed by summing the desired motor rotational speed $W_{mref}$ with the actual motor rotational speed $W_m$ (i.e., $W_{merr}=W_{mref}-W_m$), step 128.

Motor rotation speed error $W_{merr}$ and field current reference $I_{fref}$ are re-applied to the motor 44, step 130 and the cycle repeats.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

What is claimed is:

1. Apparatus for optimizing control of a dc motor having separately excited armature and field windings, in combination, comprising:
   a) a motor having an armature, an armature winding and a field winding, said windings being independently controlled;
   b) armature voltage amplifying means operatively connected to the armature of said motor for varying voltage applied thereto;

c) armature current sensing means operatively connected to said armature voltage amplifying means for sensing armature current;

d) field current amplifying means operatively connected to the field winding of said motor for varying current applied thereto;

e) field current sensing means operatively connected to said field current amplifying means for sensing field current;

f) motor speed sensing means operatively connected to said motor for generating a signal representative of rotation speed of said motor armature;

g) first reference signal means operatively connected to said motor speed sensing means for providing a first reference signal proportional to desired motor speed;

h) second reference signal means operatively connected to said armature for providing a second reference signal proportional to desired armature current;

i) third reference signal means operatively connected to said field current sensing means for providing a third reference signal proportional to desired field current; and j) optimizing control means operatively connected to said first, second and third reference signal means for receiving said first, second and third reference signals, said optimizing control means being operatively connected to said armature voltage amplifying means and to said field current amplifying means for controlling respective operations thereof.

2. The optimizing control apparatus of claim 1 wherein said optimizing control means comprises feedback controlling means.

3. The optimizing control apparatus of claim 2 wherein said optimizing control means further comprises summing means operatively connected to said feedback controlling means for providing a control signal to said armature voltage amplifying means.

4. The optimizing control apparatus of claim 2 wherein said field current sensing means generates a signal applied to said feedback controlling means.

5. The optimizing control apparatus of claim 4 wherein said motor speed sensing means generates a signal, said signal being applied to said feedback controlling means.

6. The optimizing control apparatus of claim 5 wherein a constant 1/k is derived from said feedback controller means and multiplied by said second reference signal to generate said third reference signal, said third reference signal being applied to said field current amplifying means.

7. A method for optimizing a dc motor having separately excited armature and field windings, the steps comprising:

a) reading a signal representative of desired motor speed;

b) reading signals representative of actual motor speed, armature current and field current;

c) providing a feedback controller for generating an optimal armature current to field current ratio;

d) computing optimal field current control effort as a function of signals representative of said armature current and said optimal armature current to field current ratio; and e) computing optimal armature voltage control effort as a function of signals representative of said desired motor speed and said actual motor speed.

8. The method for optimizing a dc motor of claim 7, wherein the steps further comprising repeating steps (a)-(f) to update said computed optimal field current control effort and said optimal armature voltage control effort.

9. A dc motor control system for separately exciting armature and field windings of a dc motor, comprising:

a) a dc motor;

b) sensing means operatively connected to said dc motor for providing signals representative of actual motor speed, armature current and field current;

c) a feedback controller operatively connected to said sensing means for computing an optimal armature current to field current ratio and generating a signal representative of said ratio;

d) reference signal means operatively connected to said dc motor for generating a signal representative of a desired motor speed;

e) first computation means operatively connected to said feedback controller and said sensing means for computing optimal field current control effort as a function of said signals representative of armature current and representative of said optimal armature current to field current ratio; and f) second computation means operatively connected to said feedback controller, said dc motor, said reference signal means and said sensing means for computing optimal armature voltage control effort as a function of said signals representative of said desired motor speed and representative of said actual motor speed.

* * * * *